Aug. 7, 1962

L. TONKS 3,048,534

CONTROL MEANS FOR NEUTRONIC REACTORS

Filed March 28, 1952

INVENTOR.
Lewi Tonks
BY
Roland A. Anderson
Attorney

Aug. 7, 1962

L. TONKS 3,048,534

CONTROL MEANS FOR NEUTRONIC REACTORS

Filed March 28, 1952

INVENTOR.
Lewi Tonks
BY
Roland A. Anderson
Attorney

United States Patent Office 3,048,534
Patented Aug. 7, 1962

3,048,534
CONTROL MEANS FOR NEUTRONIC REACTORS
Lewi Tonks, Schenectady, N.Y., assignor to the United
States of America as represented by the United States
Atomic Energy Commission
Filed Mar. 28, 1952, Ser. No. 278,996
9 Claims. (Cl. 204—193.2)

This invention relates to a control device for a neutronic reactor, and more particularly to a control device for an intermediate neutronic power reactor, including a breeder type of power reactor.

For an understanding of the theory and characteristics of a reactor reference is made to the copending application of Leo Szilard, Serial No. 698,334, filed September 20, 1946, and also the Fermi and Szilard copending application, Serial No. 568,904, filed December 19, 1944, now Patent No. 2,708,656, issued May 17, 1955. In addition, reference is made to the copending application of Kenneth A. Kesselring, Serial No. 279,004, filed March 28, 1952.

An object of this invention is to provide a reflector-absorber type control having diminished neutron leakage characteristics.

Another object is to provide control means for a reactor, especially one of the intermediate neutron energy type.

Still a further object is to provide such a reactor.

Another object is to provide a control means having improved breeding characteristics.

Other objects of the invention will become apparent as the following description progresses, reference being made to the accompanying drawings, where:

Figure 1:
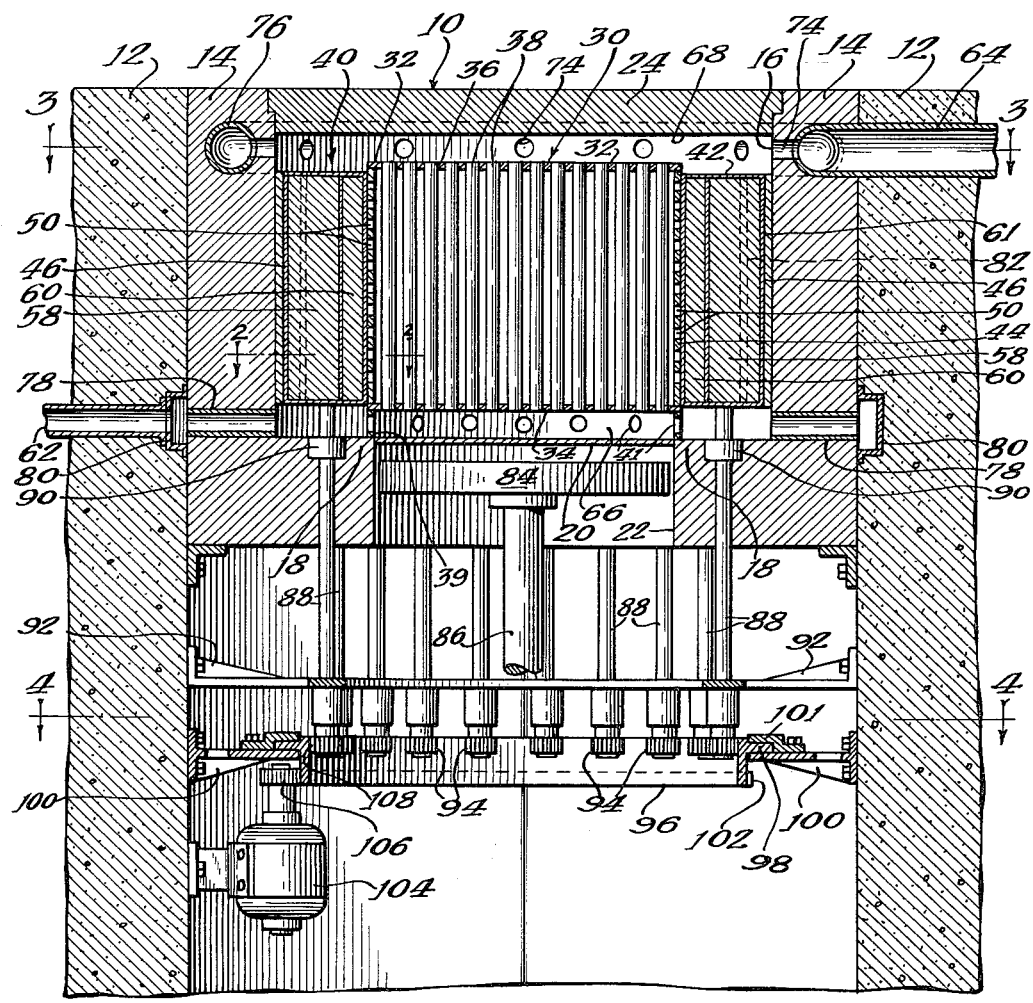
FIGURE 1 is a vertical sectional view, partly in elevation, showing one embodiment of a neutronic reactor.
Figure 3:
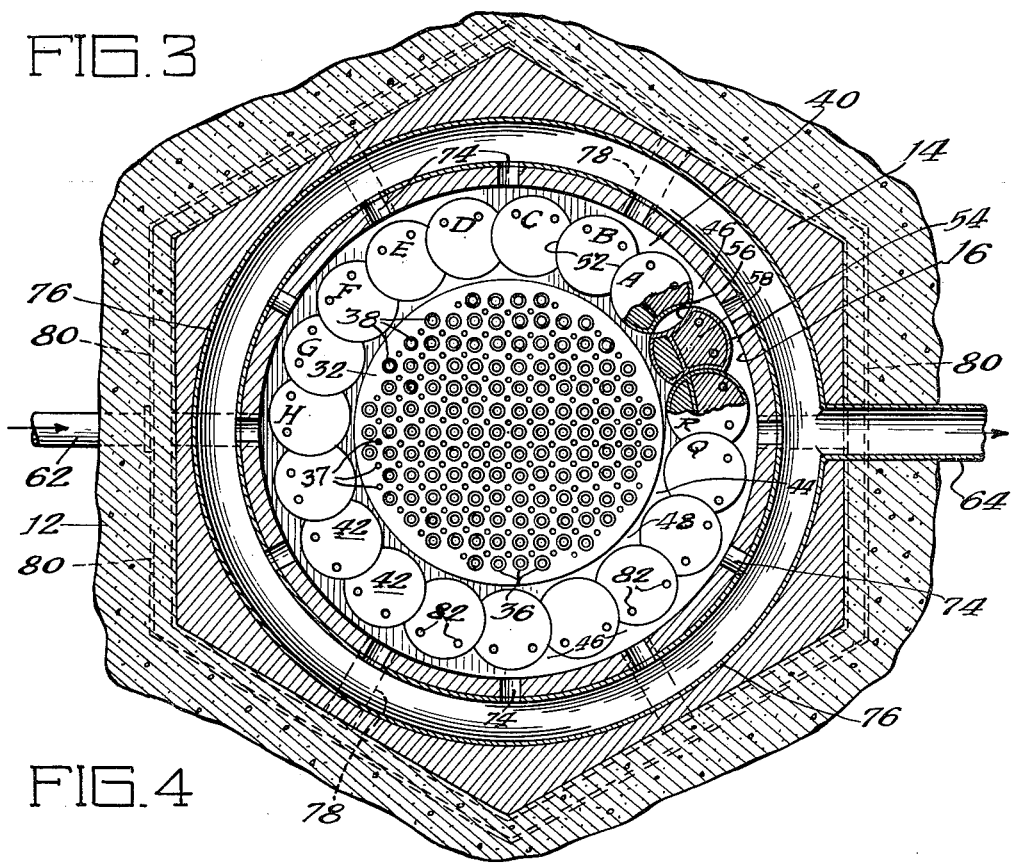
FIGURE 3 is a horizontal sectional view taken on the line 3—3 of FIGURE 1.

Referring to FIGURE 1, a neutronic reactor is generally indicated at 10 and is sustained in place by a supporting shield 12. Within the shield 12 which is composed of a material, such as concrete, having a capacity for absorbing neutrons and harmful radioactive products of fission, such as gamma rays, is an iron shield 14. As shown in FIGURE 3, the outer surface of the iron shield 14 is hexagonal; the interior is provided with a central bore 16 (FIGURE 1). The bore 16 extends for a distance approximately ¾ of the height of the shield 14 to an annular shoulder 18 which is integral with the shield. The shoulder 18 forms a smaller bore 22 about the vertical axis of the reactor 10 separated from the bore 16 by a partition plate 20 horizontally disposed flush with the shoulder. A liquid-tight union between the shoulder 18 and the periphery of the partition 20 exists. At the top of the shield 14 a covering 24 is provided for the bore 16.

The core or active portion of the reactor 10 is generally indicated at 30, centrally disposed within the bore 16 between an upper horizontal plate 32 and a lower plate 34. Both plates 32 and 34 are provided with a plurality of aligned apertures 36 between which are disposed vertically a plurality of elongated fuel elements 38. A number of smaller apertures 37 as shown in FIG. 3 are disposed in the plates 32 and 34 between the apertures 36 for the purpose of passing a coolant fluid (not shown) in a manner to be described hereinbelow. Support for the core 30 is provided by an annulus 39 between the inner periphery of the shoulder 18 and the lower plate 34. A number of apertures 41 are in the plate 39 for a purpose to be set forth below. Between the core 30 and the iron shield 14 is disposed a reactor control ring generally indicated at 40 surrounding the core similar to the stator of a motor. The control ring 40 comprises a plurality of cylindrical control rods 42, an inner annulus 44, and an outer annulus 46. The inner annulus 44 is disposed about the core 30 and is provided with fluted walls 48 (FIGURE 2) which fits snugly against the contiguous control rods 42. In addition, the inner annulus 44 is provided with a plurality of apertures 50 which permit passage of a cooled liquid (not shown) to be described below. Between the iron shield 14 and the control rods 42 is the outer annulus 46 similarly provided with fluted walls 48 (FIGURE 2) which also fit snugly against the control rods.

As shown in FIGURE 3 the control rods 42 overlap forming a continuous ring of control rods around the core or active portion 30 of the reactor 10. In order to rotate the control rods 42 about their vertical axes, each rod is provided with a vertical re-entrant surface or concavity 52 extending from the top to the bottom ends. The radius of curvature of each re-entrant surface 52 is that of the outer radius of each rod 42. In addition, as shown in FIGURE 3, a particular control rod 54 is provided with a second re-entrant surface 56 having dimensions similar to those of the re-entrants 52. All of the control rods 42, except the particular rod 54, contain only one re-entrant surface 52. Each rod 42 is separately and successively rotated in a manner to be described below.

Figure 2:
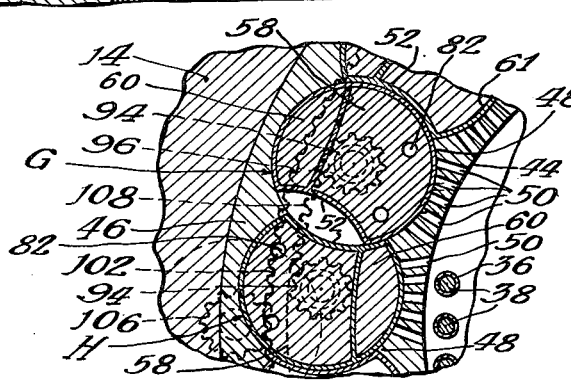
FIGURE 2 is an enlarged fragmentary sectional view taken on the line 2—2 of FIGURE 1.

In order to vary the degree of control available in the control rods 42 over the output of the reactor 10, each rod is partitioned into a reflector portion 58 and an absorber portion 60 which are encased within a jacket 61 (FIGURES 1 and 2). Accordingly, when the control rods 42 are rotated so as to present the reflector portion 58 adjacent the core 30, neutrons emitted from the fuel elements 38 are reflected back to the elements, causing increased fissions of the thermal neutron fissionable material in elements 38. On the other hand, when the absorber portion 60 of the rods 42 are contiguous to the core 30, fewer neutrons are returned to the core and thereby the power output of the reactor 10 may be controlled. It is preferred for this purpose that the inner and outer annulus 44 and 46 and the reflector portion 58 be composed of a neutron moderating material, such as beryllium. The absorber portion 60 is composed of a neutron absorbing material, such as thorium, boron and hafnium.

In order to operate the reactor 10 at a predetermined temperature, a cooling system is provided having an inlet 62 extending through the shield 12 and having an outlet 64 extending through the shields 12 and 14 (FIGURE 1). The cooling system also includes a lower plenum chamber 66 and an upper plenum chamber 68. Both chambers 66 and 68 are circular due to the fact that their peripheries are bounded by the bore 16 of the iron shield 14. The lower plenum chamber 66 is bounded on the top by the plate 34 of the core 30 and by the lower end surfaces of the control rods 42. The lower side of the lower plenum chamber 66 comprises the annular shoulder 18 at the lower end of the bore 16 and the partition 20. It is pointed out that that portion of the chamber 66 below the control rods 42 communicates with that portion of the chamber below the plate 34 via the apertures 41 disposed in the annular plate 39. The upper plenum chamber 68 is bounded above by the lower surface of the cover 24 and below by the plate 32 in addition to the upper ends of the control rods 42. Communication of the upper chamber 68 with the outlet 64 is provided by a plurality of radial feeders 74 which extend from the surface of the bore 16 to an annular header 76, which in turn connects with said outlet (FIGURE 3). On the other hand, the lower plenum chamber 66 communicates with the inlet 62 by means of a plurality of radial feeders 78 which extend from the lower end of the bore 16 to the interface between the shields 12 and 14 (FIGURES 1 and 3) where the feeders 78 connect with a coolant header 80, surrounding the outer hexagonal surface of the iron shield 14 and connecting with the inlet (FIGURE 3).

By virtue of this cooling system, a liquid coolant (not shown in the drawing), such as liquid sodium, enters the reactor 10 through the inlet 62 and rises from the lower plenum chamber 66 through the core 30 and surrounding the fuel elements 38 to the upper plenum chamber 68 via apertures 37 from which it exits through the outlet 64. In addition, the coolant enters the apertures 50 (FIGURES 1 and 2) in the inner annulus 44 in order to cool the interfaces between the inner an outer annulus 44 and 46 on one hand and the control rods 42 on the other. Finally, a number of longitudinal apertures 82 are provided in the reflector portion 58 of each control rod 42 permitting passage of the coolant therethrough.

Below the partition 20 and within the bore 22 is disposed a safety piston 84 which during normal operation of the reactor 10 is suspended in the position shown in FIGURE 1. The piston 84 is composed of a neutron reflecting material, such as beryllium, and is mounted on top of a shaft 86 that is secured to prime mover at its lower end (not shown in the drawing), whereby, in case of emergency, the piston 84 may be immediately lowered from the position shown in order to reduce reflection of neutrons back to the core 30.

Figure 4:
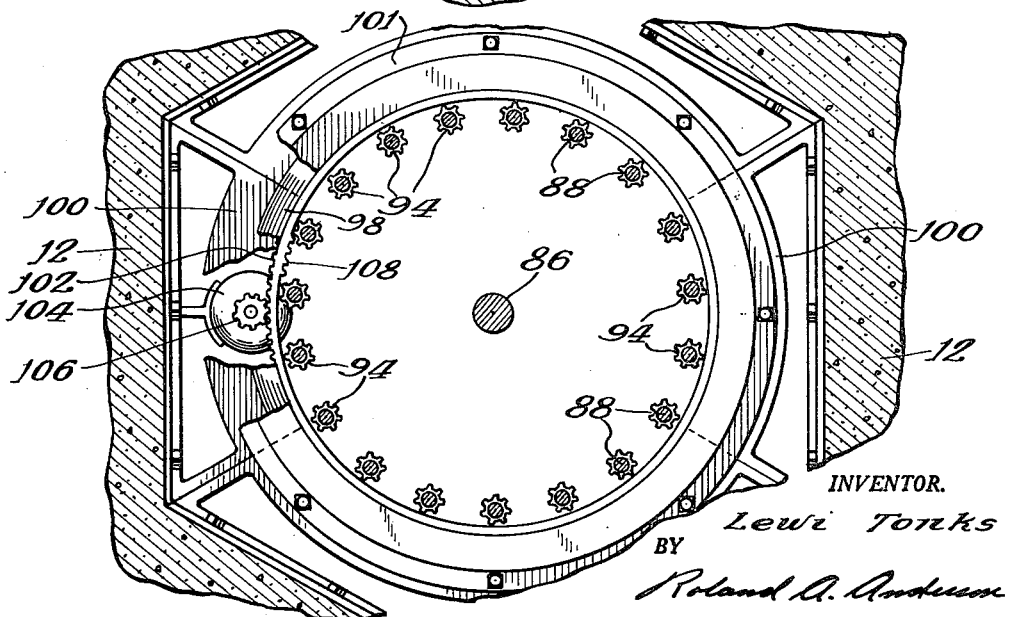
FIGURE 4 is a horizontal sectional view taken on the line 4—4 of FIGURE 1.

As was stated above, the control rods 42 revolve about their longitudinal axes. For this purpose each control rod 42 is surmounted on top of a rotatable shaft 88 which extends through the lower plenum chamber 66 and through the annular should 18 to a point below the iron shield 14. In order to prevent leakage of the coolant from the chamber 66 and along the interface of the shaft 88 and the shoulder 18, a labyrinth bearing 90 is provided. The lower ends of shafts 88 are secured in place by means of a supporting frame 92 attached to the shield 12 as shown in FIGURE 1. On the end of each shaft 88 is a pinion 94 that meshes with a ring gear 96 having a peripheral flange 98 whereby the gear is suspended in a horizontal position by means of a frame 100 attached to shield 12 (FIGURE 4). It is held in place by a retaining ring 101. Below the flange 98 is a continuous external gear 102 by which the ring gear 96 is rotated by a a reversible motor 104 through a pinion 106. In addition an internal intermittent gear 108 is provided having a sufficient number of teeth to rotate a single pinion 94 through an angle slightly greater than 180°. By virtue of this construction, a single rotation of the ring gear 96 causes the control rods 42 to rotate separately and successively in order to present either the reflector portion 58 or the absorber portion 60 adjacent the core or active portion 30 of the reactor 10, depending upon the direction in which the ring gear is rotated.

*Operation*

As was stated above the power output of reactor 10 is controlled by the operation of the control rods 42. Except for instances of emergency when the safety piston 84 is lowered from the position shown in FIGURE 1, the control rods 42 are used exclusively for the control of the output of the reactor 10. Immediately after a fresh loading of fuel has been put into the reactor, it will operate continuously at a constant power level with the absorber portions 60 of most of the control rods 42 contiguous to the core 30. As fuel is burned out and more and more fission product poisons accumulate, more of the controls rods 42 will be progressively reversed so that the reflector portions 58 are turned inward. At any stage of fuel consumption, the power can be started upward and will continue to increase if the core-contiguous reflector area is increased by a fixed amount, and the power can then be leveled off by reverting to the original control position. The converse relations hold for decreasing the reactor power.

By virtue of the construction of the control rods 42 and their positions with respect to each other whereby a portion of each control rod extends into the cavity provided by the re-entrant surface 56 of an adjacent control rod, it is necessary to rotate each control rod separately so as to present either the reflector portion 58 or the absorber portion 60 to the core 30. In addition it is necessary that the control rods be rotated successively, it being impossible to rotate a given control rod until the re-entrant surfaces 56 of two adjacent control rods are adjacent to each other. As shown in FIGURE 3, for the purpose of explanation, several of the rods 42 are designed "A," "B," "C," etc. In order to rotate the control rod 42 designated "A," the re-entrant surface 56 of the particular control rod 54 adjacent thereto is in the desired position for the immediate rotation of the control rod "A." When this is rotated by the gear ring 96 counterclockwise through an angle slightly greater than the 180°, the concavity provided by the re-entrant surface 56 of rod "A" is adjacent to that of the control rod designated "B." As the ring gear 96 is continuously rotated counterclockwise, the internal intermittent gear 108 upon leaving the pinion 94 of the control rod "A" immediately contacts the pinion of the control rod "B," whereupon it is rotated in a similar fashion to the control rod "A." Further rotation of the ring gear 96 causes the control rods 42 to be rotated separately and successively presenting similar portions of the control rod to the core 30. This operation is more clearly shown in FIGURE 2 in which a segment of the circle of the control rods 42 is shown together with the pinions 94, the ring gear 96, and the pinion 106 of the motor 104. In FIGURE 2 the control rod in the position of that identified as "G" in FIGURE 3 is shown nearing the completion of its rotation with respect to the control rod "H." It is evident that the re-entrant surface 56 of the upper control rod 42 is approaching a position facing the re-entrant surface of the lower control rod. At the same time the forward end of the internal intermittent gear 108 is approaching the pinion 94 of the control rod "H," next to be rotated, while the rear end of the gear is leaving the preceding pinion.

The process shown in FIGURE 2 is repeated until the internal intermittent gear 108 rotates particular control rod 54 (FIGURE 3), at which point the motor 104 is stopped. The fact that the particular control rod 54 is provided with two oppositely disposed re-entrant surfaces 56 makes possible the rotation of the control rod "A" in the first instance. If the particular control rod 54 were provided with only one re-entrant surface there would be no starting point for rotation. For this reason it is necessary that one control rod be provided with two re-entrant surfaces 56.

Obviously, many modifications may be made in the specific embodiments disclosed without departing from the intended scope of the invention.

What is claimed is:

1. A neutronic reactor comprising an active portion, and a control device comprising a plurality of contiguous cylinders around said active portion, each cylinder being partially filled with a neutron absorbing material and partially filled with a neutron reflecting material, each cylinder having a longitudinal re-entrant surface into which a portion of an adjacent cylinder extends, one of said cylinders having a second re-entrant surface substantially oppositely disposed, and means for rotating successively the cylinders about their longitudinal axes, whereby the sides of the cylinders having material of similar neutron characteristics can be placed against said active portion.

2. A control device comprising a plurality of contiguous cylinders, each cylinder being partially filled with a neutron absorbing material and partially filled with a neutron reflecting material, each cylinder having a longitudinal re-entrant surface into which a portion of an adjacent cylinder extends, one of said cylinders having a second re-entrant surface substantially oppositely disposed, and means for rotating successively the cylinders about their longitudinal axes.

3. A control device comprising a plurality of parallel contiguous cylinders of similar diameter, each cylinder having a neutron absorbing material in one longitudinal portion and a neutron reflecting material oppositely disposed therein, each cylinder also having a first longitudinal re-entrant surface into which a portion of an adjacent cylinder extends, one of the cylinders having a second re-entrant surface substantially oppositely disposed from the first, and means for rotating successively the cylinders about their longitudinal axes.

4. A device comprising a cylinder having a quantity of neutron reflecting material disposed longitudinally in one segment of the cylinder and a quantity of neutron absorbing material disposed longitudinally in another segment of the cylinder, said cylinder being circular except for two opposed longitudinal re-entrant surfaces or concavities, each re-entrant concavity having a radius of curvature equal to the radius of the cylinder, the axis of the cylinder being outside the plane containing the axes of the re-entrant concavities, and the surface between the segments connecting the concavities.

5. A control device comprising a plurality of contiguous cylinders, each cylinder having a quantity of beryllium in one side and a quantity of hafnium oppositely disposed from the beryllium, the beryllium and hafnium extending longitudinally thereof, each cylinder also having a first longitudinal re-entrant surface into which a portion of an adjacent cylinder extends, one of the cylinders having a second re-entrant surface substantially oppositely disposed from the first, each re-entrant being arcuate with a diameter equal to that of the cylinder, and means for rotating successively the cylinders approximately 180° about their longitudinal axes.

6. A control device comprising a plurality of contiguous cylinders, each cylinder having a quantity of beryllium in one side and a quantity of boron oppositely disposed from the beryllium, the beryllium and boron extending longitudinally thereof, each cylinder also having a first longitudinal re-entrant surface into which a portion of an adjacent cylinder extends, one of the cylinders having a second re-entrant surface substantially oppositely disposed from the first, each re-entrant being arcuate with a diameter equal to that of the cylinder, and means for rotating successively the cylinders approximately 180° about their longitudinal axes.

7. A device comprising a cylinder having a quantity of beryllium disposed longitudinally in one segment of the cylinder and a quantity of hafnium disposed longitudinally in another segment of the cylinder, said cylinder being circular except for two opposed longitudinal re-entrant surfaces or concavities, each re-entrant concavity having a radius of curvature equal to the radius of the cylinder, the axis of the cylinder being outside the plane containing the axes of the re-entrant concavities, and the surface between the segments connecting the concavities.

8. A device comprising a cylinder having a quantity of beryllium disposed longitudinally in one segment of the cylinder and a quantity of boron disposed longitudinally in another segment of the cylinder, said cylinder being circular except for two opposed longitudinal re-entrant surfaces or concavities, each re-entrant concavity having a radius of curvature equal to the radius of the cylinder, the axis of the cylinder being outside the plane containing the axes of the re-entrant concavities, and the surface between the segments connecting the concavities.

9. A device comprising a cylinder having a quantity of beryllium disposed longitudinally in one segment of the cylinder and a quantity of boron carbide disposed longitudinally in another segment of the cylinder, said cylinder being circular except for two opposed longitudinal re-entrant surfaces or concavities, each re-entrant concavity having a radius of curvature equal to the radius of the cylinder, the axis of the cylinder being outside the plane containing the axes of the re-entrant concavities, and the surface between the segments connecting the concavities.

References Cited in the file of this patent

UNITED STATES PATENTS

| | | |
|---|---|---|
| 2,305,555 | Peters | Dec. 15, 1942 |
| 2,364,746 | Nemnich | Dec. 12, 1944 |
| 2,434,392 | Chace | Jan. 13, 1948 |

FOREIGN PATENTS

| | | |
|---|---|---|
| 233,011 | Switzerland | Oct. 2, 1944 |
| 614,386 | Great Britain | Dec. 14, 1948 |

OTHER REFERENCES

Physical Review, vol. 48, August 1, 1935, pages 265, 277. Part of an article by Dunning et al.

Clark Goodman: The Science and Engineering of Nuclear Power, pages 275, 303–308. Volume 1. Addison-Wesley Press (1947).

H. D. Smyth: A General Account of the Development of Methods of Using Atomic Energy for Military Purposes. Pages 21–25, August 1945.